(12) United States Patent
Chu

(10) Patent No.: US 7,284,131 B2
(45) Date of Patent: Oct. 16, 2007

(54) METHOD FOR OPERATING INTERNET SITE OFFERING ENCRYPTED CONTENTS

(75) Inventor: Chang-nam Chu, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 1009 days.

(21) Appl. No.: 09/770,225

(22) Filed: Jan. 29, 2001

(65) Prior Publication Data

US 2002/0010860 A1 Jan. 24, 2002

(30) Foreign Application Priority Data

Jan. 27, 2000 (KR) ................................ 2000-4052

(51) Int. Cl.
*H04L 9/00* (2006.01)
(52) U.S. Cl. ...................................... 713/182; 713/182
(58) Field of Classification Search ................. 713/182
See application file for complete search history.

(56) References Cited

U.S. PATENT DOCUMENTS

| | | | |
|---|---|---|---|
| 6,005,939 A * | 12/1999 | Fortenberry et al. | 705/76 |
| 6,169,976 B1 * | 1/2001 | Colosso | 705/59 |
| 6,317,729 B1 * | 11/2001 | Camp et al. | 705/79 |
| 6,373,948 B1 * | 4/2002 | Wool | 380/241 |

FOREIGN PATENT DOCUMENTS

| | | |
|---|---|---|
| KR | 1999-23602 | 3/1999 |
| KR | 1999-52718 | 7/1999 |
| KR | 2000-216 | 1/2000 |

\* cited by examiner

*Primary Examiner*—Nasser Moazzami
*Assistant Examiner*—Pramila Parthasarathy
(74) *Attorney, Agent, or Firm*—Sughrue Mion, PLLC

(57) ABSTRACT

A method for operating an Internet site providing encrypted contents is provided, and includes the steps of (a) a site server determining whether or not a customer accessing the site is a registered subscriber; (b) automatically generating a customer-unique encryption key, establishing the site using environment information from the customer computer, and logging-in through a main page in which the customer can select desired contents, when the customer accessing the site is a non-subscriber in the step (a) and the non-subscriber customer requests to register as a subscriber by providing his personal information to the site server; (c) logging in through the main page when, in the step (a), it is determined that the customer accessing the site is a subscriber, using customer information provided by the customer computer; and (d) providing the selected content to the customer computer, after encrypting the content with the customer-unique encryption key.

8 Claims, 3 Drawing Sheets

METHOD FOR OPERATING INTERNET SITE OFFERING ENCRYPTED CONTENTS

BACKGROUND OF THE INVENTION

1. Field of the Invention

The present invention relates to a service using the Internet, and more particularly, to a method for operating an Internet site which encrypts and provides songs or video images. The present application is based on Korean Patent Application No. 2000/4052 filed Jan. 27, 2000, which is incorporated herein by reference.

2. Description of the Related Art

Recently the number of Internet service providers who provide encrypted contents on the Internet has increased rapidly. Here, encrypted contents means the contents of songs or videos that are encrypted using an encryption key unique to a user. That is, a site server that provides encrypted contents encrypts songs or videos with an encryption key unique to a user and then downloads them to the user's computer. At this time, if an encryption key that is stored in the site server is identical to a user-unique encryption key stored in the user's computer, the encryption of the content is deciphered using the encryption key and then the encrypted content can be reproduced through a computer-dedicated player.

That is, using a computer, a user receives encrypted content from a site server, and in order to reproduce received encrypted content, an encryption key to decipher the encrypted content and a computer-dedicated player are required. Also, the encryption key and computer-dedicated player are provided by the site server.

FIG. 1 is a conceptual diagram for showing in detail the operating method of the conventional Internet site providing encrypted contents.

Referring to FIG. 1, in order for a user to successfully receive encrypted content and then reproduce it in a computer, the user must access the corresponding Internet site (10), register as a member by providing personal information, and then log in (12). Then, the user receives an encryption key unique to the user from the site server, and stores (14) the key in the user's computer, requests download (20) of a computer-dedicated player to the site server, and then installs (22) the player in his computer.

Also, considering, for example, the user's computer as a medium, the user receives the encrypted content in a portable player (18), and to reproduce the content, an extended program (16) must be installed in the user's computer. Through the extended program (16) installed in the user's computer, the portable player (18) can receive the user-unique encryption key from the site server and store the key. Further, the portable player (18) can receive encrypted content from the site server, and reproduce the content by deciphering the received encrypted content with a previously stored user-unique encryption key.

As such, when an encryption key and a dedicated player or an extended program are installed in a user's computer, a series of processes (26-30) in which encrypted content is downloaded from the site server, and reproduced through a dedicated player 24 installed in the user's computer or the portable player 18, can be carried out.

In the conventional method, however, it is difficult to sequentially perform this series of processes. That is, as shown in FIG. 1, if a user accesses the Internet site, a log-in menu (12), a menu for downloading (20) the computer-dedicated player, and a content selection menu (26) are displayed at the same time. Therefore, a user who does not know that the series of processes must be performed as described may try to select and download desired content. Then, the server displays a menu that requests a user ID and password. The user inputs an arbitrary ID and password and then downloads a selected song to the portable player (18) or to the user's computer.

If the user downloads the content to the computer, it is impossible to reproduce the downloaded content because the player for reproducing the downloaded content is not downloaded. Therefore, the user downloads (20) the player, installs (22) the player, and then tries to reproduce the content, using the dedicated player (24) or portable player (18). However, the content downloaded from the site server is encrypted, and a process in which the user computer or portable player (18) receives the encryption key to decipher the encrypted content from the site server has not been performed. Therefore, the player (24) installed in the user's computer or the portable player (18) cannot reproduce the encrypted content.

As described above, in the conventional method, it is difficult to sequentially perform the series of processes in which an encryption key is downloaded and stored, a computer-dedicated player is installed, and the encrypted content is received and reproduced. Therefore, the conventional method has caused much annoyance.

SUMMARY OF THE INVENTION

To solve the above problems, it is an object of the present invention to provide a method for operating an Internet site in which encrypted content is provided and a user who accesses the site for the first time can use services conveniently.

It is another object to provide a computer readable recording medium in which a computer program for performing the method for operating an Internet site is stored.

To accomplish the above object of the present invention, there is provided a method for operating a site providing encrypted contents by using the site server as a medium in a computer network system in which the site server and users' computers are connected through a communication method. The site server for providing contents that are encrypted using customer-unique encryption keys and the computers that belong to customers who want to use the contents provided by the site server are connected through a communication network. The method includes the steps of (a) the site server determining whether or not a customer accessing the site is a registered subscriber; (b) automatically generating a customer-unique encryption key, establishing a site using environment information from the customer computer, and logging-in through a main page in which the customer can select desired contents, when the customer accessing the site is a non-subscriber in the step (a) and the non-subscriber customer requests to register as a subscriber by providing personal information to the site server; (c) logging in through the main page wherein the customer can select desired contents when, in the step (a), it is determined that the customer accessing the site is a subscriber using customer information provided by the customer computer; and (d) providing the content selected using the customer computer, to the customer computer, after encrypting the content with the customer-unique encryption key.

To accomplish another object of the present invention, there is also provided a computer readable recording medium in which a computer program for performing a method for operating a site providing encrypted contents is stored, the method using the site server as a medium in a computer network system in which the site server and users' computers are connected through a communication method. The site server for providing contents that are encrypted using customer-unique encryption keys and the computers that belong to customers who want to use the contents provided by the site server are connected in a communication network. The method for operating the site includes the steps of (a) the site server determining whether or not a customer accessing the site is a registered subscriber; (b) automatically generating a customer-unique encryption key, establishing the site using environment information from the customer computer, and logging-in through a main page in which the customer can select desired contents, when it is determined that the customer accessing the site is a non-subscriber in the step (a) and the non-subscriber customer requests to register as a subscriber by providing personal information to the site server; (c) logging in through the main page wherein the customer can select desired contents when, in step (a), it is determined that the customer accessing the site is a subscriber using customer information provided by the customer computer; and (d) providing the content selected using the customer computer to the customer computer, after encrypting the content with the customer-unique encryption key.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Hereinafter, embodiments of the present invention will be described in detail with reference to the attached drawings. The present invention is not restricted to the following embodiments, and many variations are possible within the spirit and scope of the present invention. The embodiments of the present invention are provided in order to more completely explain the present invention to anyone skilled in the art.

Figure 1:
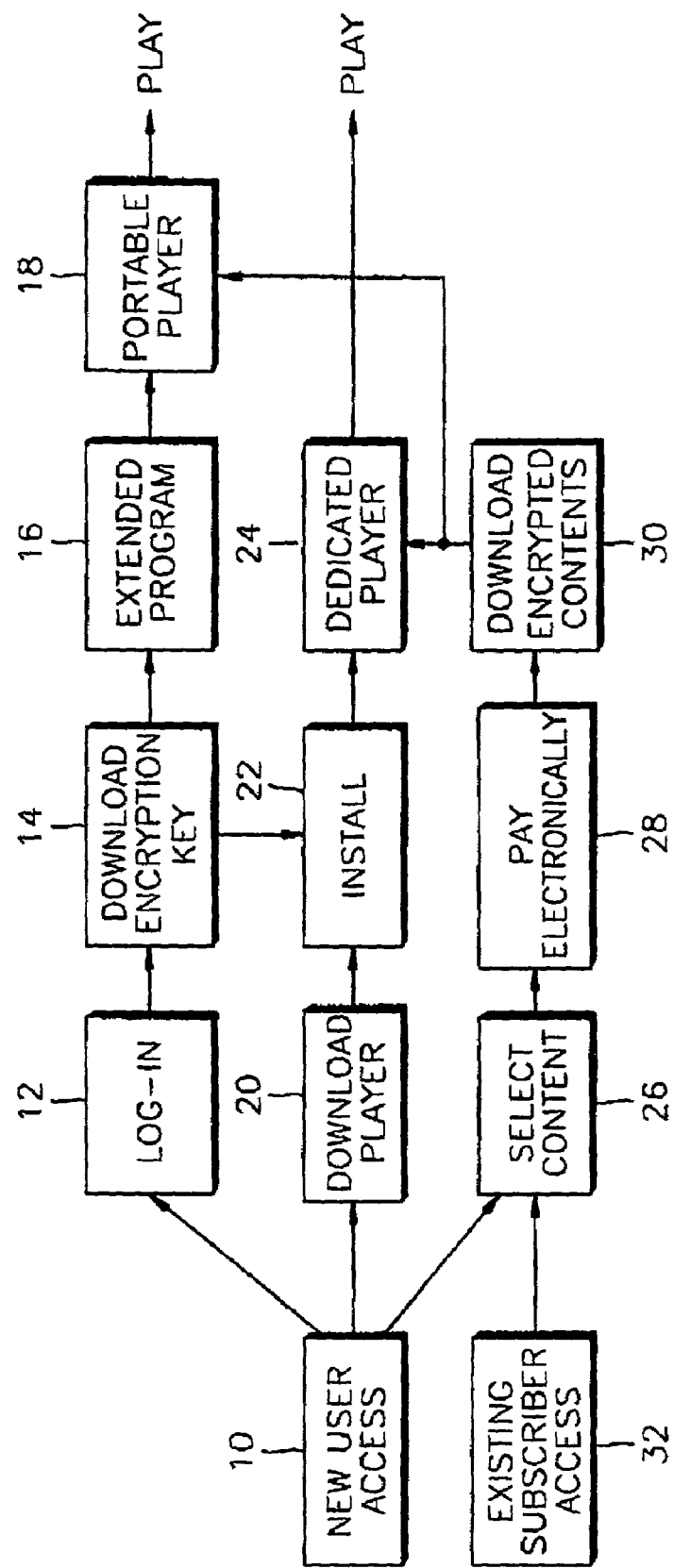
FIG. 1 is a conceptual diagram for showing in detail the operating method of the conventional Internet site providing encrypted contents.
Figure 2:
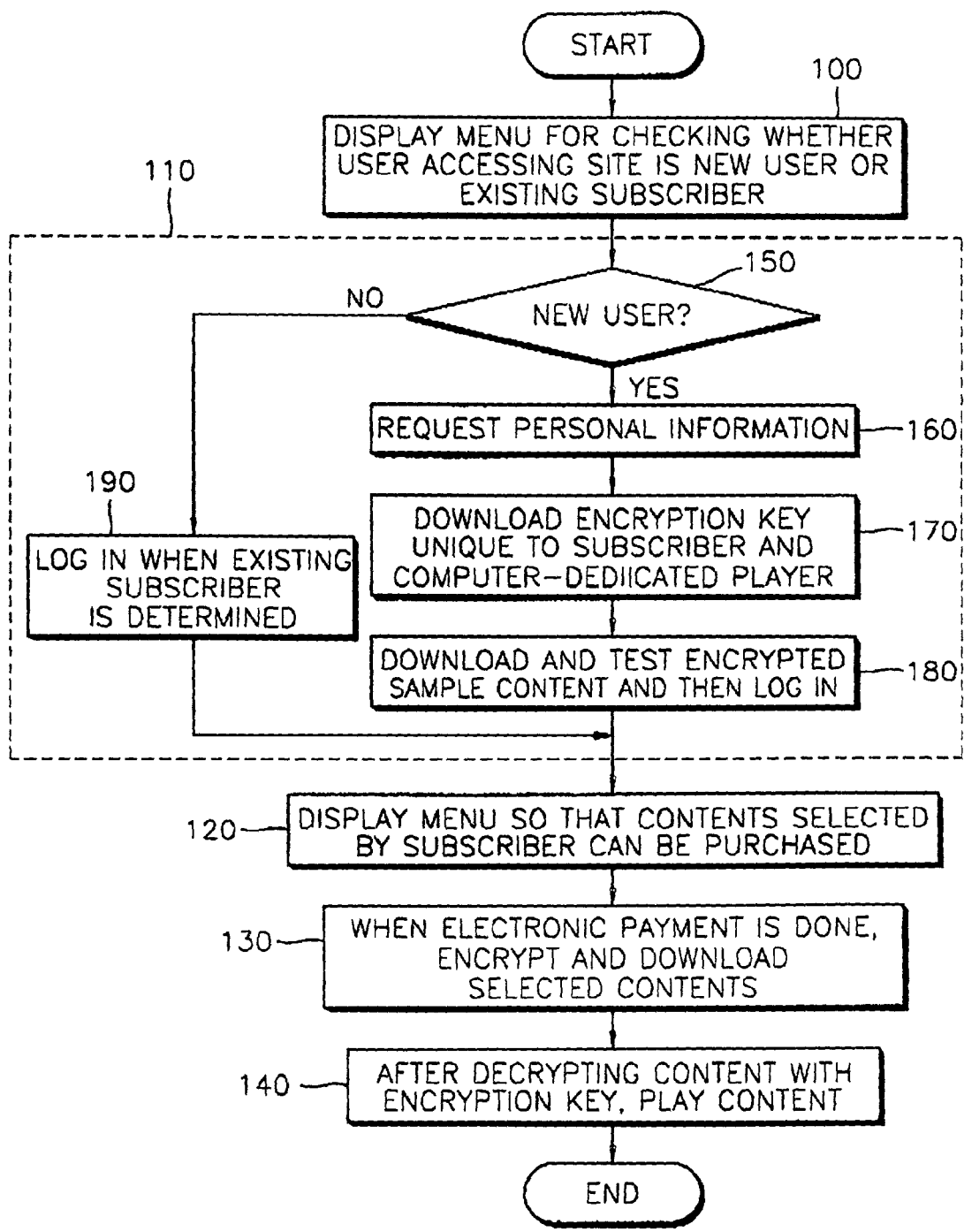
FIG. 2 is a flowchart showing a method for operating an Internet site providing encrypted contents according to the present invention.

FIG. 2 is a flowchart showing an embodiment of a method for operating an Internet site providing encrypted contents according to the present invention. The flowchart shown in FIG. 2 illustrates a method for operating an Internet site providing encrypted content; for example, FIG. 2 shows a site server (54, See FIG. 3) as a medium in a computer network system in which the site server that manages the Internet site providing encrypted content, and at least one customer computer (60, See FIG. 3) that belongs to the customer who uses the service provided by the site server (54) are connected in a communication network.

More specifically, a method for operating an Internet site providing encrypted content according to an embodiment of the present invention includes logging in through different routes according to whether a user who accesses the site is an existing subscriber or a new subscriber in steps 100 and 110, providing selected contents after encryption if the contents selected by a subscriber is electronically purchased in steps 120 and 130, and reproducing the contents after deciphering the encrypted contents, using an encryption key, if the user who received the selected contents requests reproduction in step 140.

Figure 3:
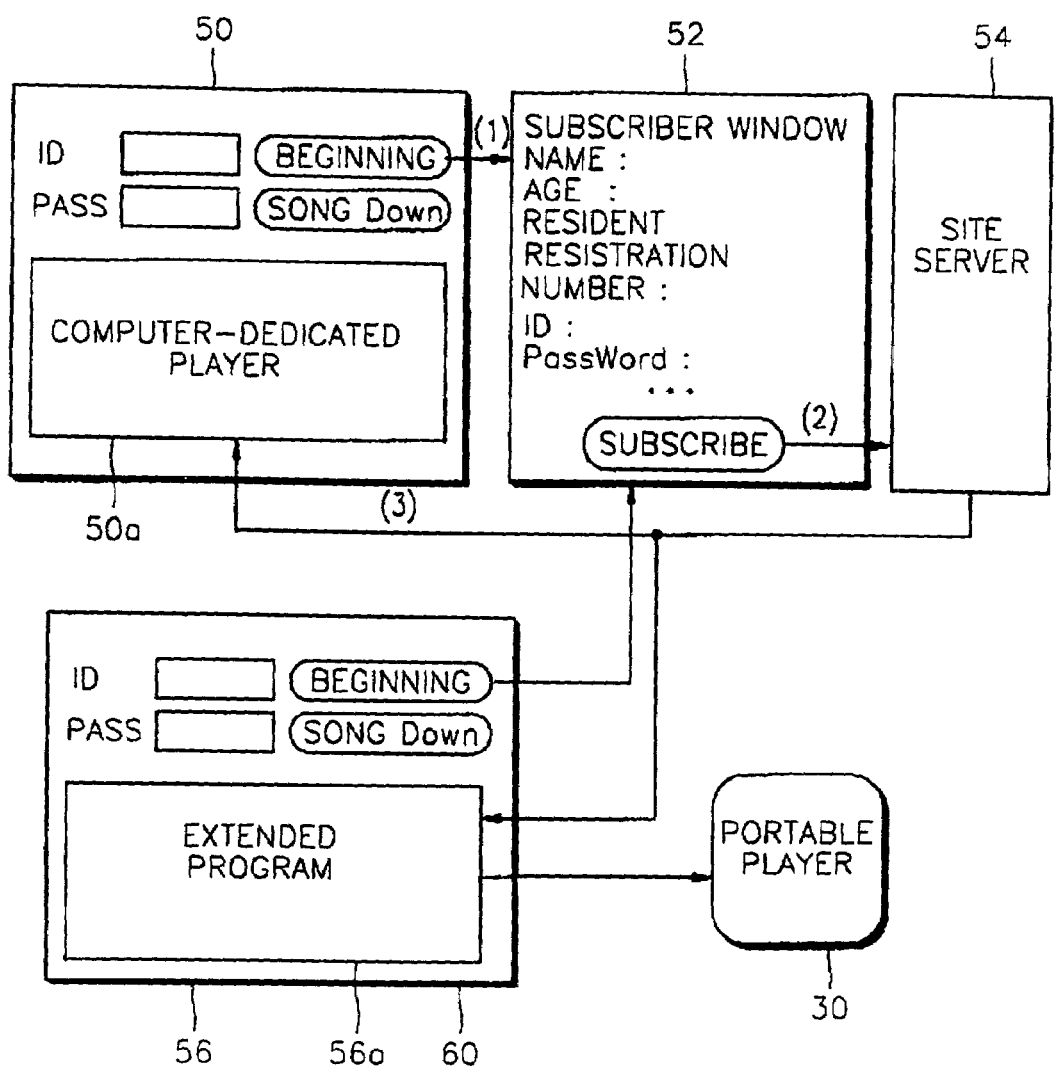
FIG. 3 illustrates screens displayed on a computer monitor when the method shown in FIG. 2 is performed.

FIG. 3 illustrates an example of screens displayed on a user computer when the method shown in FIG. 2 is performed.

Referring to FIGS. 2 and 3, when a user accesses the site server 54 providing encrypted content to a user computer 60, an initial page 50 as shown in FIG. 3 appears on the user computer 60. Here, the contents include music, videos, and recently highlighted MP3 files. The site server 54 provides an initial menu for checking whether the user accessing the site is a registered customer or a non-registered customer to a customer computer 60 in step 100.

After the step 100, the site server 54 allows registered customers and non-registered customers, respectively, to input predetermined information to log-in in step 110. That is, the site server 54 lets a non-registered customer input personal information according to a predetermined subscriber-registration procedure, establishes a database of customers and a site using environment information, and then lets the customer log in. Also, the site server 54 allows registered customers to input information unique to the customer in order to log in. Here, the user-unique information is the customer identification (ID) and password (PASS).

The step 110 will now be explained more specifically. The site server 54 determines whether or not the user accessing the site is a registered customer, based on the data sent from the customer computer 60 in step 150. If a non-registered customer accesses the site, a page 52 which requests personal information from the customer is provided to the customer computer in step 160. As shown in FIG. 3, if the customer accesses the site server 54 using the customer computer 60, an initial page which has an input space for an ID and password (PASS) for subscribers and a "beginning" button for non-subscribers is displayed on the customer computer 60. If the customer clicks on the "beginning" button (1), the site server 54 displays a subscriber window 52 for inputting personal information so that the customer can register as a subscriber. In the subscriber window 52, the customer inputs personal information including "name", "age", "resident registration number", "ID", and "password".

If the customer clicks on the "subscribe" button (2) after inputting all requested personal information, customer's personal information is sent to the site server 54, and then the site server 54 generates an encryption key unique to the customer, using the personal information. At this time, the site server 54 generates the key, using the "resident registration number" and personal information. Also, the generated encryption key is downloaded and stored in the customer computer 60, and a computer-dedicated player 50*a* is downloaded (3) and installed in the customer computer 60 in step 170. Meanwhile, the site server 54 establishes a database of customers, using the generated encryption key and new subscriber's personal information.

If the encryption key and computer-dedicated player 50*a* are installed in the customer computer 60 as described above, the site server 54 downloads sample content, which is encrypted using the customer's encryption key, to the customer computer 60, and a reproduction test is performed. When the sample content is reproduced, the customer logs in in step 180. Here, the log-in means that the customer moves to the main page where he can download desired contents to his computer. That is, if the sample content downloaded from the site server 54 is successfully reproduced in the customer computer 60, it indicates that the customer-unique encryption key and computer-dedicated player 50a have been successfully installed in the customer computer 60.

As described in the steps 160 through 180, the customer who newly registers as a subscriber is only requested to input personal information after clicking on the "beginning" button. Then, the encryption key and computer-dedicated player are automatically installed and the reproduction test of content is also automatically performed. Therefore, the subscriber who accesses the site server 54 for the first time can more conveniently enjoy the services provided by the site server 54.

Meanwhile, in the step 150, if the customer accessing the site server 54 is a previously registered subscriber, he inputs the customer-unique ID and password (PASS) in the initial page 50. Here, in the customer computer of the previously registered subscriber, the customer-unique encryption key and computer-dedicated player 50a are already installed. When the site server 54 determines that the customer is a subscriber after checking the ID and password (PASS) input by the customer, the customer logs in through the main page where the customer can download a desired content in step 190.

After the step 110, when content is selected by the customer, the site server 54 displays an electronic payment menu for using the selected content on the customer computer 60 in step 120. At this time, the electronic payment can be done using a credit card, electronic money, bank account transfer, etc.

In the step 120, when the electronic payment is performed, the site server 54 encrypts the selected content, using the customer-unique encryption key, and downloads the encrypted content to the customer computer 60 in step 130.

The encrypted content downloaded to the customer computer 60 is deciphered using the encryption key downloaded in step 170, and can be reproduced by the computer-dedicated player 50a in step 140.

According to the method for operating an Internet site providing encrypted contents of the present invention as described above, a customer who visits the Internet site for the first time registers as a subscriber just by inputting his personal information, and then environment information, from which encrypted content from the site server is provided and reproduced, is installed in the customer computer. Therefore, the customer can more conveniently use the Internet site providing encrypted contents.

Meanwhile, by installing a predetermined extended program 56a provided by the site server 54 to the customer computer 60, the encryption key and encrypted content provided by the site server 54 can be downloaded to the portable player 30 through the customer computer 60. Also, considering, for example, the extended program 56a as a medium, the encrypted content provided by the site server 54 is downloaded to the portable player 30. Therefore, the encrypted content downloaded to the portable player 30 can be deciphered using the encryption key already downloaded and stored, and successfully reproduced.

The present invention may be embodied in program code, which can be read by a computer from a computer readable recording medium. The computer readable recording medium may be any kind on which computer readable data is stored. The computer readable recording media may be storage media such as magnetic storage media (e.g., ROM's, floppy disks, hard disks, etc.), optically readable media (e.g., CD-ROMs, DVDs, etc.), or carrier waves (e.g., transmissions over the Internet). Also, the computer readable recording media can be scattered on computer systems connected through a network and can store and execute computer readable code in a distributed mode.

As described above, according to the method for operating an Internet site providing encrypted contents, if a customer who visits the Internet site for the first time registers as a subscriber by inputting his personal information, environment information, from which encrypted content from the site server is provided and reproduced, is automatically installed. Therefore, the customer can more conveniently use the Internet site providing encrypted contents.

What is claimed is:

1. A method of enabling a site server and a customer to share at least one of a contents encryption and a contents decryption key, the method comprising:
   the site server receiving personal information of the customer, wherein said received personal information is sent by the customer using a customer computer;
   generating, at the site server, a unique encryption key corresponding to the received personal information of the customer and encrypting contents using the unique encryption key;
   transmitting, from the site server, the generated unique encryption key, a computer-dedicated player, which plays deciphered downloaded encrypted content and encrypted contents, to the customer computer;
   storing, at the site server, the personal information of the customer and the unique encryption key; and
   generating, at the site server, a customer database using the stored personal information and the unique encryption key,
   wherein the downloaded content is deciphered based on the generated unique encryption key and reproduced by the computer-dedicated player.

2. The method of claim 1, wherein the personal information of the customer is generated based on a resident registration number of the customer.

3. The method of claim 1, wherein the personal information comprises a customer name.

4. A method of enabling a site server and a customer to share at least one of a contents encryption and a contents decryption key, the method comprising:
   the customer transmitting personal information of the customer, to the site server;
   receiving, from the site server, a computer-dedicated player, which plays deciphered downloaded content, and a unique specific encryption key corresponding to the personal information of the customer and encrypted contents, wherein content is encrypted using the unique encryption key;
   storing, at the site server, the personal information of the customer and the contents unique specific encryption key; and
   generating, at the site server, a customer database using the stored personal information and the contents unique specific encryption key,
   wherein downloaded content is deciphered based on the unique specific encryption key and reproduced by the computer-dedicated player.

5. The method of claim 4, wherein the personal information of the customer is generated based on a resident registration number of the customer.

6. The method of claim 2, further comprising storing the personal information of the customer and the unique specific encryption key.

7. A contents encryption method enabling a site server and a customer to share at least one of a contents encryption key and a contents decryption key, said method comprising:
- receiving, at the site server, personal information of the customer, wherein said received personal information is sent by the customer;
- generating, at the site server, a unique encryption key corresponding to the personal information of the customer and encrypting contents using the unique encryption key;
- transmitting, from the site server, said generated unique encryption key a computer-dedicated player, which plays downloaded encrypted content and encrypted contents, to a customer computer;
- storing, at the site server, the personal information of the customer and the unique encryption key; and
- generating, at the site server, a customer database using the stored personal information and the unique encryption key, wherein the downloaded content is deciphered based on the unique encryption key and reproduced by the computer-dedicated player.

8. A content decryption method enabling a site server and a customer to share at least one of a contents encryption key and a contents decryption key, said method comprising:
- transmitting, to the site server, personal information of a customer, by the customer;
- receiving a computer-dedicated player, which plays encrypted downloaded content, a unique encryption key corresponding to the personal information of the customer and encrypted contents;
- decrypting, by the computer-dedicated player, the encrypted downloaded content using the unique encryption key and reproduced by the computer-dedicated player,
- storing, at a site server, the personal information of the customer and the unique encryption key; and
- generating, at the site server, a customer database using the stored personal information and the unique encryption key.

* * * * *